United States Patent [19]

Fischer et al.

[11] Patent Number: 4,642,475
[45] Date of Patent: Feb. 10, 1987

[54] UNINTERRUPTIBLE POWER SUPPLY

[75] Inventors: Dietmar Fischer; Christian Kublick, both of Erlangen, Fed. Rep. of Germany

[73] Assignee: Siemens Aktiengesellschaft, Munich and Berlin, Fed. Rep. of Germany

[21] Appl. No.: 736,226

[22] Filed: May 20, 1985

[30] Foreign Application Priority Data

May 24, 1984 [DE] Fed. Rep. of Germany ....... 3419420

[51] Int. Cl.$^4$ ........................... H02M 5/45; H02J 7/34
[52] U.S. Cl. ....................................... 307/66; 307/46; 307/48; 363/37
[58] Field of Search ....................... 307/43, 44, 45, 46, 307/48, 64, 66; 363/34, 37

[56] References Cited

U.S. PATENT DOCUMENTS

| 1,669,527 | 5/1928 | Meyer | 363/34 |
| 1,970,329 | 8/1934 | Marrison | 307/66 |
| 3,249,769 | 5/1966 | Mierendorf | 307/66 X |

Primary Examiner—William M. Shoop, Jr.
Assistant Examiner—Bentsu Ro
Attorney, Agent, or Firm—F. W. Powers; J. L. James; J. R. Penrod

[57] ABSTRACT

The invention pertains to an uninterruptible power supply (UPS) with a rectifier supplied with power by a power network, connected to an intermediate circuit having a battery as well as to an inverter connected to the intermediate circuit for supplying an interruption protected power source. The control for the main input rectifier and the inverter is supplied using two secondary rectifiers, whose outpus are connected in parallel through decoupling diodes. The first secondary rectifier which supplies power to the control unit in normal operation, is connected to the input power network. In order to ensure power supply to the control unit in the event of a power failure in a simple fashion, even if the voltage of the protected output drops, one input of the second secondary rectifier is connected to an electrical midpoint of an intermediate circuit which is formed by two capacitors bridging the intermediate circuit and the return connection of the second secondary rectifier is connected to the main connection of two serially connected static converter devices of the inverter.

2 Claims, 1 Drawing Figure

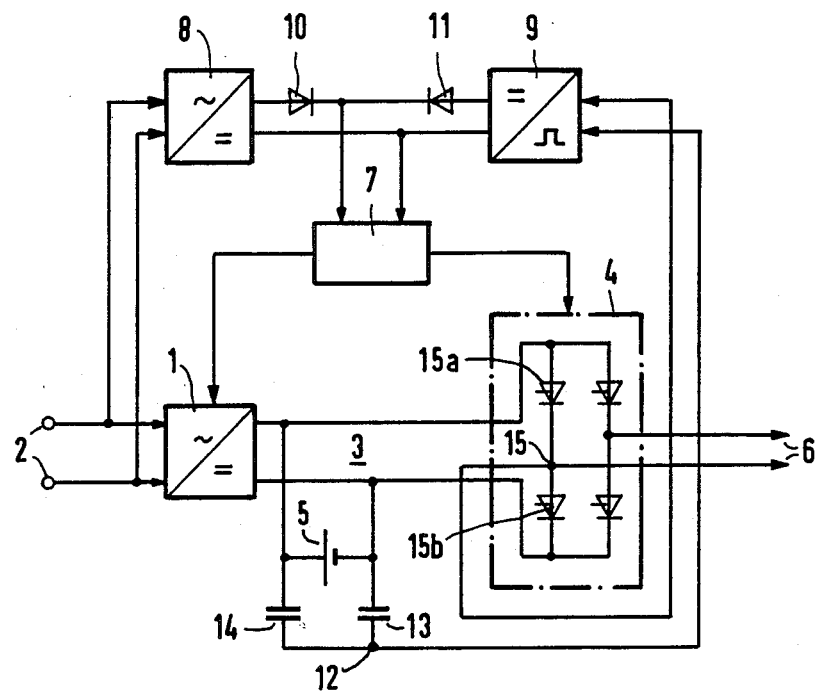

UNINTERRUPTIBLE POWER SUPPLY

BACKGROUND OF THE INVENTION

This invention relates to the field of electrical power supplies, and more particularly to uninterruptible alternating current power supplies.

A typical uninterruptible power supply has an input connected to a source of a.c. power such as the power line system. This input is rectified and filtered, and used to charge or maintain charge on a storage battery which stores electrical energy for use during periods in which the power line system is undergoing a power outage. The rectified and filtered power, i.e. direct current power, is then inverted into a.c. power again which is then used to supply uninterruptible a.c. power to a variety of electrical equipment. Control of the inverter is provided by a separate circuit which is powered by rectified a.c. line power through a decoupling diode during normal operation or during periods of power line outage by rectified a.c. inverter output power through a decoupling diode. The disadvantage of this arrangement is that in case of a voltage drop in the interruption protected output lines, such as occurs during a short circuit, the power supply for the control circuitry and thereby the inverter can fail. Accordingly, it will be appreciated that it is highly desirable to supply the power to the inverter control circuit independently from the inverter output.

It is an object of this invention to provide an uninterruptible power supply which in the event of a power outage will securely maintain inverter control and operation even in the case of a voltage drop of the interruption protected output line. It is a further object of this invention to provide the power to the inverter control immediately upon an a.c. line power outage.

SUMMARY OF THE INVENTION

Briefly stated, in accordance with one aspect of the invention, the foregoing objects are provided by providing an uninterruptible power supply for connection to an a.c. power line input having a first rectifier circuit converting the a.c. power input into d.c. power. During normal operation, this d.c. power supply is converted back to an a.c. power output by a controlled inverter circuit. During a.c. power outages, however, this first rectifier circuit cannot provide power, which is then supplied to the controlled inverter by a battery instead. Also during such power outages, the power for the inverter control circuits is provided independent of the inverter thus insuring controlled operation even during periods of reduced inverter output voltage. This independent power is supplied from the midpoint of a network connected across the battery and a midpoint of two of the inverter devices.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing which is a simplified circuit diagram of the uninterruptible power supply.

DETAILED DESCRIPTION OF THE DRAWING

The a.c. voltage side of a rectifier 1 is connected to the terminals 2 of a power supply. The d.c. voltage side of rectifier 1 is connected by an intermediate circuit 3 to the d.c. voltage input of an inverter 4. The intermediate circuit battery 5 is included in the intermediate circuit 2. The a.c. voltage side of the inverter 4 is the protected system 6. The intermediate circuit battery 5 assumes the power supply of the inverter 4 if power supply 2 fails, with battery 5 being constantly charged by the rectifier 1 in normal operation. At the a.c. voltage output of the inverter 4 there is a protected a.c. voltage which is not subject to outages in the power supply and which supplies the protected system 6. To operate the rectifier 1 and inverter 4, a control unit 7 is required which controls the static converter power output both of rectifier 1 as well as of inverter 4. The power supply of this control unit 7 has to be assured even in case of a power outage.

In the embodiment shown in the FIGURE, the control unit 7 is supplied by two rectifiers 8 and 9, whose d.c. voltage outputs are connected in parallel through two isolating diodes 10 and 11 are routed to the control unit 7. Thus, in the event of a power outage, an immediate switch-over is assured with no switching gaps. Rectifier 8, which supplies the control unit 7 in normal operation, is connected on the a.c. voltage side to the terminals 2 of the power supply. The one input terminal of the second inverter 9 is connected to the electrical midpoint of the intermediate circuit 3, which in the embodiment shown is the midpoint point 12 of two essentially equal capacitors 13 and 14 which are connected in a voltage divider configuration across the intermediate circuit 3 or the intermediate circuit battery 5. The second input terminal of the rectifier 9 is connected to the main connection 15 of two static converter devices 15a and 15b of the inverter 4, which in the embodiment shown is depicted schematically as a thyristor bridge circuit.

Naturally, this invention can also be actualized with poly-phase bridge circuits or with an inverter having a poly-phase midpoint circuit, if necessary. One must also emphasize that both rectifiers 8 and 9 can be connected by separate transformers to power supply 2, and to the power connection from the intermediate circuit 3.

In this embodiment, the two devices 15a and 15b of the power side of the inverter 4 are also utilized as an auxiliary inverter in a poly-wave circuit to supply rectifier 9. Since in this case the static converter devices 15a and 15b are electrically conductive regardless of the pulse pattern and of the modulation of the inverter 4 in every cycle for 180 degrees, the rectified value of the output voltage of this half-wave circuit remains constant and depends entirely on the magnitude of the voltage in intermediate circuit 3 at typical power frequencies. Thus, it will now be understood that there has been disclosed an improved uninterruptible power supply system which provides a controlled inverter output even when that output is reduced as a result of a heavy load or short circuit.

As will be evident from the foregoing description, certain aspects of the invention are not limited to the particular details of the example illustrated, and it is therefore contemplated that other modifications or applications will occur to those skilled in the art, such as to poly-phase uninterruptible power supplies, it is accordingly intended that the claims shall cover all such modifications and applications as do not depart from the true spirit and script of the invention.

What is claimed as new and desired to be secured by Letters Patent of the United States is:

1. An uninterruptible power supply for connection to an a.c. power line having a first rectifier circuit, comprising:
    an intermediate circuit connected to the output of said first rectifier circuit;
    a battery as part of said intermediate circuit for storing electrical energy;
    a voltage divider as part of said intermediate circuit connected across said battery and having an electrical terminal which under open circuit conditions is the midpoint of the voltage across the battery;
    an inverter circuit having a bridge configuration of power components connected to said intermediate circuit on the input side of said bridge;
    an inverter control circuit, connected to the control terminals of said bridge configuration power components; and
    a second rectifier circuit, connected to one of the output terminals of said inverter bridge circuit, and to said midpoint of said voltage divider as the input to said second rectifier, providing d.c. power through a decoupling diode to said inverter control circuit during periods of a.c. power line outage.

2. An uninterruptible power supply according to claim 1, wherein said voltage divider is comprised of two serially connected capacitors.

* * * * *